(12) United States Patent
Kataoka et al.

(10) Patent No.: US 10,538,159 B2
(45) Date of Patent: Jan. 21, 2020

(54) HIGH-PRESSURE TANK MOUNTING STRUCTURE

(71) Applicant: TOYOTA JIDOSHA KABUSHIKI KAISHA, Toyota-shi, Aichi-ken (JP)

(72) Inventors: Chiaki Kataoka, Nagakute (JP); Shinsuke Kinoshita, Toyota (JP); Osamu Sawai, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/020,317

(22) Filed: Jun. 27, 2018

(65) Prior Publication Data

US 2019/0047407 A1 Feb. 14, 2019

(30) Foreign Application Priority Data

Aug. 9, 2017 (JP) .................................. 2017-154168

(51) Int. Cl.
*B60K 15/035* (2006.01)
*B60K 15/063* (2006.01)
*B60K 15/03* (2006.01)

(52) U.S. Cl.
CPC .. *B60K 15/03519* (2013.01); *B60K 15/03006* (2013.01); *B60K 15/063* (2013.01); *B60K 2015/0321* (2013.01); *B60K 2015/0358* (2013.01); *B60K 2015/03118* (2013.01); *B60K 2015/03315* (2013.01); *B60K 2015/0634* (2013.01); *B60Y 2306/01* (2013.01); *B60Y 2400/102* (2013.01)

(58) Field of Classification Search
CPC ............ B60K 15/013; B60K 15/03006; B60K 15/03519; B60K 15/063; B60K 15/07; B60K 2015/03118; B60K 2015/0321; B60K 2015/03315; B60K 2015/0358; B60K 2015/0634; B60Y 2306/01; B60Y 2400/102; Y10T 137/6855; Y10T 137/6881; Y10T 137/6892; Y10T 137/7039
USPC ................................ 137/351, 354, 376, 899
See application file for complete search history.

(56) References Cited

U.S. PATENT DOCUMENTS

| | | | |
|---|---|---|---|
| 6,257,360 B1 * | 7/2001 | Wozniak | B60K 15/013 180/69.5 |
| 9,878,611 B1 * | 1/2018 | Abd Elhamid | B60K 15/03006 |
| 2003/0178422 A1 * | 9/2003 | Kosuge | B60K 15/03006 220/4.14 |
| 2004/0026427 A1 * | 2/2004 | Shigematsu | B60K 15/03006 220/562 |

(Continued)

FOREIGN PATENT DOCUMENTS

JP 2007-080655 A 3/2007
JP 2009-270707 A 11/2009

*Primary Examiner* — Kevin F Murphy
*Assistant Examiner* — Jonathan J Waddy
(74) *Attorney, Agent, or Firm* — Oliff PLC

(57) ABSTRACT

A high-pressure tank mounting structure includes: a case disposed beneath a floor of a vehicle cabin and having a bottom wall, a peripheral wall and a top wall; and a plurality of high-pressure tanks accommodated so as to be lined up within the case, wherein a first hydrogen collection portion that is recessed upwardly is formed at a back surface of the top wall of the case, and a hydrogen sensing sensor is disposed at the first hydrogen collection portion.

10 Claims, 12 Drawing Sheets

(56) References Cited

U.S. PATENT DOCUMENTS

| | | | |
|---|---|---|---|
| 2005/0169724 A1* | 8/2005 | Sharp | B60K 15/07 410/42 |
| 2006/0032532 A1* | 2/2006 | Suess | B60K 15/03006 137/266 |
| 2006/0033322 A1* | 2/2006 | Suess | B60K 15/03006 280/830 |
| 2006/0113131 A1* | 6/2006 | Kato | B60K 1/04 429/434 |
| 2007/0007060 A1* | 1/2007 | Ono | B60K 1/04 180/65.31 |
| 2008/0297362 A1* | 12/2008 | Veenstra | F17O 13/025 340/632 |
| 2009/0032318 A1* | 2/2009 | Ishitoya | B60K 1/04 180/65.31 |
| 2009/0272590 A1* | 11/2009 | Kim | B60K 15/03006 180/69.5 |
| 2011/0140483 A1* | 6/2011 | Veenstra | B60K 15/07 296/210 |
| 2014/0375043 A1* | 12/2014 | Finck | B60K 15/063 280/831 |
| 2019/0047404 A1* | 2/2019 | Sawai | B60K 15/03 |
| 2019/0047409 A1* | 2/2019 | Kataoka | B60K 15/067 |
| 2019/0047410 A1* | 2/2019 | Kataoka | B60K 15/07 |
| 2019/0047411 A1* | 2/2019 | Kataoka | F17C 13/084 |
| 2019/0047633 A1* | 2/2019 | Sawai | B60K 15/07 |

\* cited by examiner

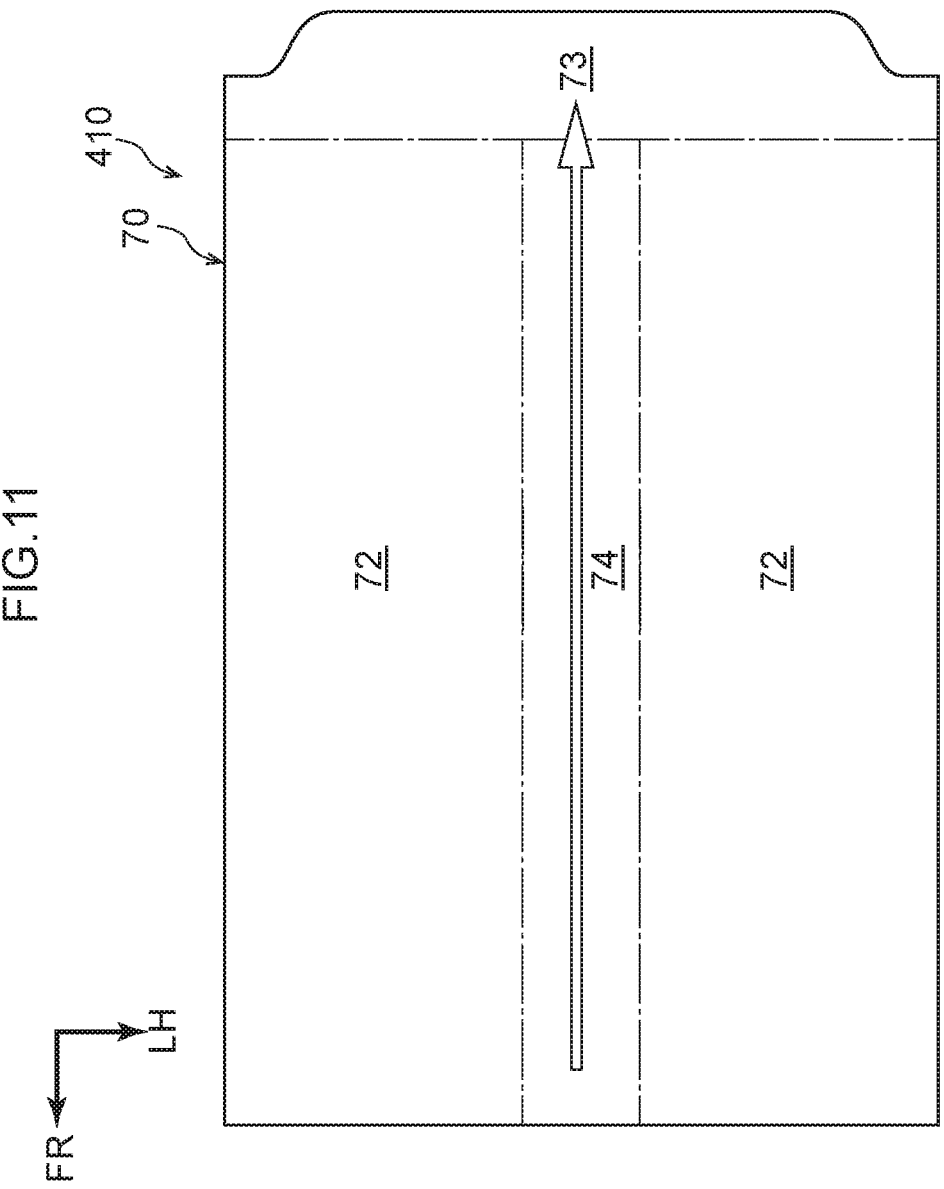

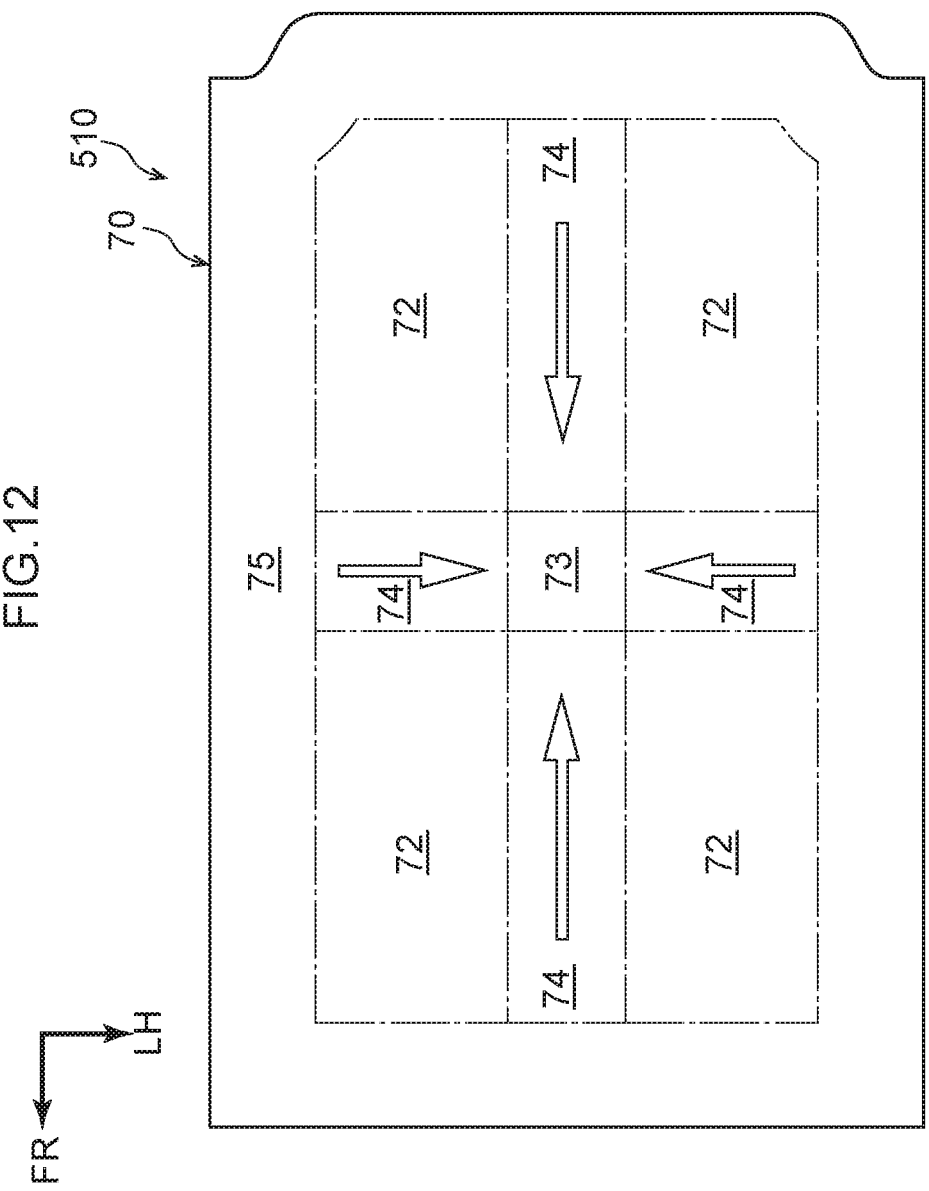

HIGH-PRESSURE TANK MOUNTING STRUCTURE

CROSS-REFERENCE TO RELATED APPLICATION

This application claims priority under 35 USC 119 from Japanese Patent Application No. 2017-154168 filed Aug. 9, 2017, the disclosure of which is incorporated by reference herein in its entirety.

BACKGROUND

Technical Field

Preferred embodiments relate to a high-pressure tank mounting structure.

Related Art

A high-pressure tank mounting structure is disclosed in Japanese Patent Application Laid-Open (JP-A) No. 2009-270707. In this mounting structure, high-pressure tanks (hydrogen tanks) are accommodated within a case for hydrogen storing bodies that forms a closed space.

SUMMARY

However, in the aforementioned related art, there is the problem that hydrogen that has permeated from the high-pressure tanks stagnates within the case.

In consideration of the above-described circumstances, an object of preferred embodiments is to provide a high-pressure tank mounting structure that accommodates high-pressure tanks in a case, and that can easily sense hydrogen that has permeated from the high-pressure tanks.

A high-pressure tank mounting structure of a first aspect of the present disclosure includes: a case that is disposed beneath a floor of a vehicle cabin, and that has a bottom wall, a peripheral wall and a top wall; and plural high-pressure tanks that are accommodated so as to be lined up within the case, wherein a first hydrogen collection portion that is recessed upwardly is formed in a back surface of the top wall of the case, and a hydrogen sensing sensor is disposed at the first hydrogen collection portion.

In the high-pressure tank mounting structure of the first aspect, the case, which has the bottom wall, the peripheral wall and the top wall, is disposed beneath the floor of a vehicle cabin. The plural high-pressure tanks are accommodated so as to be lined up in the case. Due thereto, in a high-pressure tank mounting structure in which plural high-pressure tanks are disposed beneath the floor of a vehicle cabin, the high-pressure tanks can be protected from interference with the road surface and from fire.

Moreover, in this high-pressure tank mounting structure, the first hydrogen collection portion that is recessed upwardly is formed at the back surface of the top wall of the case, and the hydrogen sensing sensor is disposed at this first hydrogen collection portion. Due thereto, hydrogen, which has permeated form the high-pressure tanks, can be accumulated in the first hydrogen collection portion, and this accumulated hydrogen can be sensed by the hydrogen sensing sensor. Accordingly, the hydrogen can be sensed easily.

The high-pressure tank mounting structure of a second aspect of the present disclosure, in the high-pressure tank mounting structure of the first aspect, further includes a discharging mechanism that discharges, to an exterior of the case, hydrogen that has been accumulated at the first hydrogen collection portion.

In the high-pressure tank mounting structure of the second aspect, the discharging mechanism, which discharges the hydrogen that has been accumulated at the first hydrogen collection portion, is provided. Due thereto, the hydrogen can be discharged effectively.

In a high-pressure tank mounting structure of a third aspect of the present disclosure, in the high-pressure tank mounting structure of the second aspect, the discharging mechanism includes: a discharge hole that communicates an interior of the case with the exterior of the case; a shutter that opens and closes the discharge hole; and a control section that controls opening and closing of the shutter in accordance with output of the hydrogen sensing sensor.

In the high-pressure tank mounting structure of the third aspect, the discharging mechanism is structured to include the discharge hole, the shutter and the control section. The interior and the exterior of the case are communicated by the discharge hole, and the discharge hole is opened and closed by the shutter. Further, the control section controls the opening and closing of the shutter in accordance with the output of the hydrogen sensing senor. Due thereto, by opening the shutter only in cases in which hydrogen is sensed for example, the hydrogen is discharged appropriately while penetration of water and the like from the exterior can be suppressed.

In a high-pressure tank mounting structure of a fourth aspect of the present disclosure, in the high-pressure tank mounting structure of any of the first through third aspects, the first hydrogen collection portion is positioned at a vehicle longitudinal direction central portion and a vehicle transverse direction central portion of the top wall.

In the high-pressure tank mounting structure of the fourth aspect, the first hydrogen collection portion is positioned at the vehicle longitudinal direction central portion and the vehicle transverse direction central portion of the top wall. Due thereto, the hydrogen can be accumulated efficiently in the first hydrogen collection portion, as compared with a structure in which the first hydrogen collection portion is positioned only in a vicinity of an edge portion of the top wall as seen in a vehicle plan view.

In a high-pressure tank mounting structure of a fifth aspect of the present disclosure, in the high-pressure tank mounting structure of any of the first through fourth aspects, a guide portion, which is inclined downwardly toward an outer edge portion of the top wall, is formed in at least one of a front side, a rear side, a right side and a left side of the first hydrogen collection portion.

In the high-pressure tank mounting structure of the fifth aspect, the guide portion, which is inclined downwardly toward an outer edge portion of the top wall, is formed in at least one of the front side, the rear side, the right side and the left side of the first hydrogen collection portion. Due thereto, the hydrogen that is at the outer edge portion of the top wall can be guided by the guide portion to the first hydrogen collection portion.

In a high-pressure tank mounting structure of a sixth aspect of the present disclosure, in the high-pressure tank mounting structure of any of the first through fourth aspects, guide portions, which are inclined downwardly toward outer edge portions of the top wall, are formed at all of a front side, a rear side, a right side and a left side of the first hydrogen collection portion.

In the high-pressure tank mounting structure of the sixth aspect, the guide portions, which are inclined downwardly toward outer edge portions of the top wall, are formed at all of the front side, the rear side, the right side and the left side of the first hydrogen collection portion. Due thereto, the hydrogen can be guided to the first hydrogen collection portion from the outer edge portions of the top wall by the guide portions of the four directions.

In a high-pressure tank mounting structure of a seventh aspect of the present disclosure, in the high-pressure tank mounting structure of any of the first through fourth aspects, the first hydrogen collection portion is positioned at a vehicle transverse direction central portion of the top wall, a guide portion, which is inclined downwardly toward an outer edge portion of the top wall, is formed at a front side or a rear side of the first hydrogen collection portion, and, as seen in a vehicle plan view, the first hydrogen collection portion and the guide portion are configured to overlap a tunnel portion of a floor panel that structures a floor portion of the vehicle cabin.

In the high-pressure tank mounting structure of the seventh aspect, the first hydrogen collection portion is positioned at the vehicle transverse direction central portion of the top wall. The guide portion, which is inclined downwardly toward an outer edge portion of the top wall, is formed at the front side or the rear side of the first hydrogen collection portion. Further, as seen in a vehicle plan view, the first hydrogen collection portion and the guide portion overlap the tunnel portion of the floor panel that structures the floor portion of the vehicle cabin. Due thereto, by utilizing, of the floor panel, the tunnel portion that is convex upwardly, it is possible to place a portion of the case at a relatively upper side of the vehicle.

In a high-pressure tank mounting structure of an eighth aspect of the present disclosure, in the high-pressure tank mounting structure of any of the fifth through seventh aspects, a second hydrogen collection portion, which is recessed upwardly and is positioned further toward a vehicle lower side than the first hydrogen collection portion, is formed at a back surface of an outer peripheral portion of the top wall.

In the high-pressure tank mounting structure of the eighth aspect, the second hydrogen collection portion, which is recessed upwardly and is positioned further toward the vehicle lower side than the first hydrogen collection portion, is formed at the back surface of the outer peripheral portion of the top wall. Due thereto, the hydrogen can be guided from the second hydrogen collection portion via the guide portion(s) to the first hydrogen collection portion. Because the outer peripheral portion of the top wall is a portion where hydrogen is apt to accumulate due to tilting of the vehicle, discharging of the hydrogen can be carried out effectively.

As described above, the high-pressure tank mounting structures of the respective aspects of the present disclosure have the excellent effect of, in a high-pressure tank mounting structure in which high-pressure tanks are accommodated in a case, being able to easily sense hydrogen that has permeated from the high-pressure tanks.

BRIEF DESCRIPTION OF THE DRAWINGS

Preferred embodiments will be described in detail based on the following figures, wherein:

FIG. 11 is a drawing schematically showing movement of hydrogen which has permeated in modified example 3; and FIG. 12 is a drawing schematically showing movement of hydrogen which has permeated in modified example 4.

DETAILED DESCRIPTION

First Embodiment

A high-pressure tank mounting structure Si relating to a first embodiment of the present invention is described hereinafter.

Note that arrow FR that is shown appropriately in the respective drawings indicates the vehicle forward side, arrow UP indicates the vehicle upward side, and arrow LH indicates the vehicle transverse direction left side. Further, when longitudinal, vertical and left-right directions are used in the following description without being specified, they refer to the longitudinal of the vehicle longitudinal direction, the vertical of the vehicle vertical direction and the left and right of the vehicle transverse direction.

Figure 1:
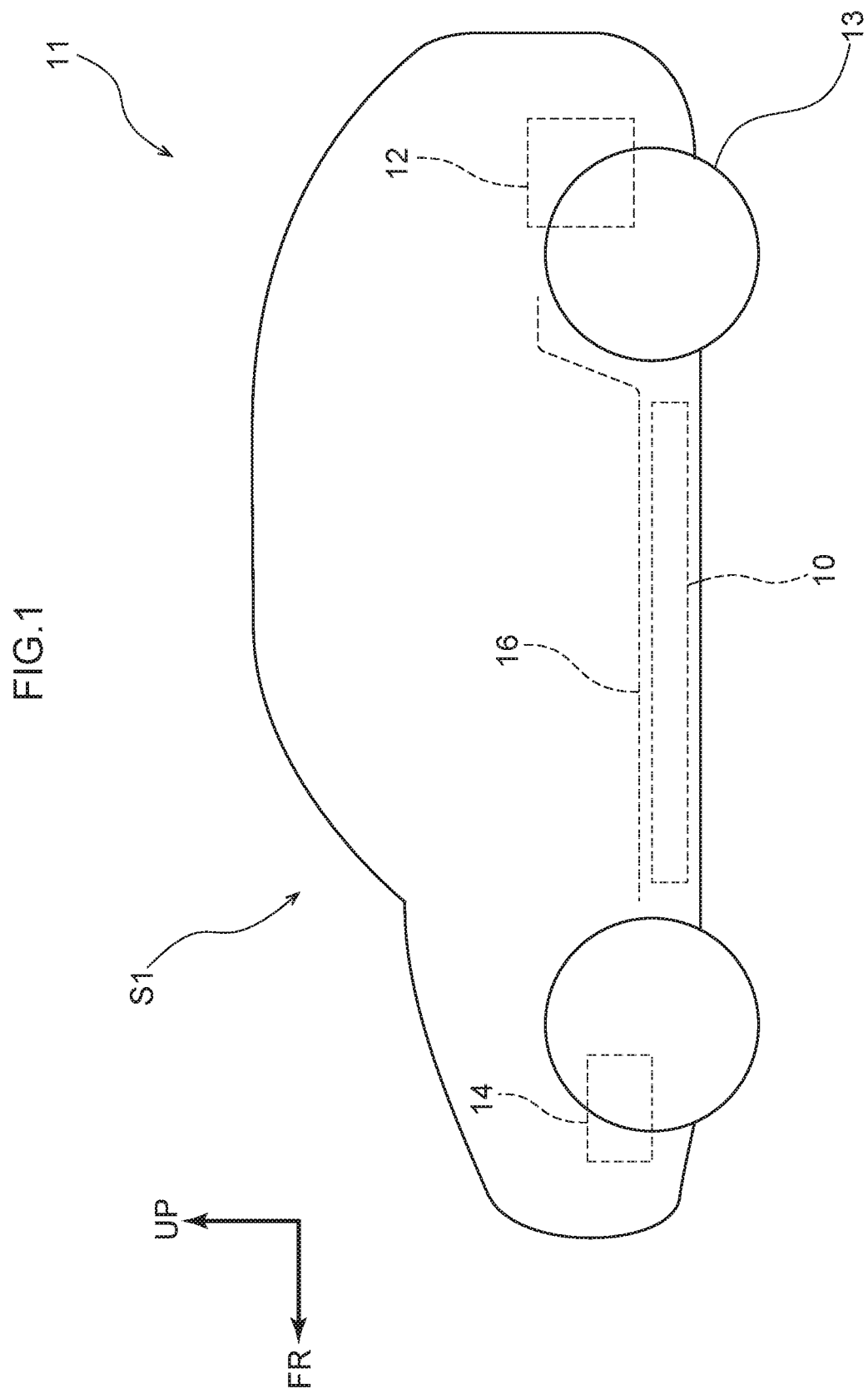
FIG. 1 is a schematic side view showing a fuel cell vehicle in which a high-pressure tank unit is mounted.

As shown in FIG. 1, a fuel cell vehicle 11 (hereinafter called "vehicle 11") to which the high-pressure tank mounting structure Si is applied is structured to include a driving motor 12, an FC stack 14 (fuel cell stack), and a high-pressure tank unit 10.

In the present embodiment, as an example, the driving motor 12 is disposed at a vehicle rear portion. Due to the driving motor 12 driving, output from the driving motor 12 is transmitted via an unillustrated transmission mechanism to rear wheels 13.

Further, the FC stack 14 is disposed at a vehicle front portion. The FC stack 14 is a stacked structure in which plural single cells, which are structural units, are stacked together, and the FC stack 14 functions as a high-voltage power source. Further, each single cell that structures the FC stack 14 generates electric power by an electrochemical reaction of hydrogen gas, which is supplied from the high-pressure tank unit 10 that is described later, and compressed air that is supplied from an unillustrated air compressor. Further, an unillustrated storage battery is provided at the vehicle 11. The storage battery is a chargeable/dischargeable battery, and a nickel-hydrogen secondary battery, a lithium-hydrogen secondary battery, or the like is used therefor. Due to electric power being supplied from this storage battery to the driving motor 12, the driving motor 12 is driven, and regenerated electric power is recovered from the driving motor 12 at times of deceleration regeneration.

Figure 2:
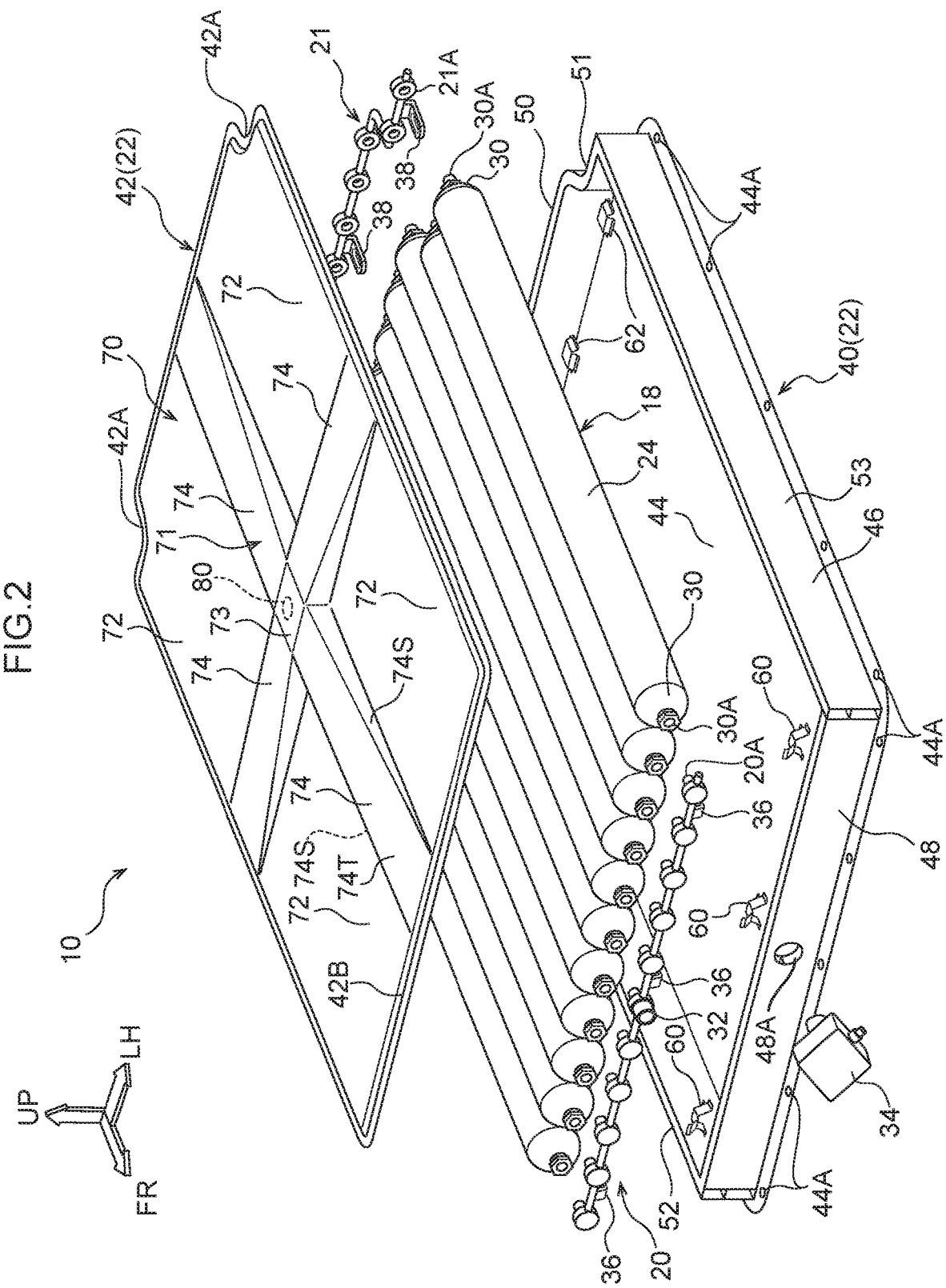
FIG. 2 is an exploded perspective view of a high-pressure tank unit of an embodiment.

The high-pressure tank unit 10 is disposed at a vehicle lower side of a floor panel 16 that structures a floor portion of the vehicle cabin. As shown in FIG. 2, the high-pressure tank unit 10 is structured to include a case 22, plural high-pressure tanks 18, and manifolds 20, 21.

The high-pressure tanks 18 are formed in substantially cylindrical shapes that are elongated and whose axial directions are the length directions. The plural high-pressure tanks 18 are arrayed adjacent to one another. In the present embodiment, as an example, eleven of the high-pressure tanks 18 are disposed at a uniform interval in the vehicle transverse direction, with the axial directions thereof being along the vehicle longitudinal direction.

Further, positions of vehicle front side end portions of the eleven high-pressure tanks 18 are aligned. Seven high-pressure tanks 18 that are at a vehicle central region are formed to have the same lengths in the axial direction. On the other hand, vehicle longitudinal direction (axial direction) lengths of two high-pressure tanks 18 at a vehicle left side and two high-pressure tanks 18 at a vehicle right side are formed to be shorter than those of the other high-pressure tanks 18. Therefore, the rear end portions of these four high-pressure tanks 18 are positioned further toward a vehicle front side than the rear end portions of the other high-pressure tanks 18.

Each of the high-pressure tanks 18 is structured to include a body portion 24 and mouthpieces 30. The body portion 24 is formed in the shape of a cylinder whose axial direction both end portions are open. In the present embodiment, as an example, the body portion 24 is formed of an aluminum alloy.

The mouthpieces 30 are provided at the axial direction both end portions of the body portion 24. The both end portions of the body portion 24 are closed-off by the mouthpieces 30. The mouthpiece 30 at a vehicle front end side and the mouthpiece 30 at a vehicle rear end side are structured similarly. The mouthpieces 30 have connecting portions 30A, and the manifolds 20, 21 are connected to the connecting portions 30A.

The high-pressure tanks 18 are connected in the vehicle transverse direction by the manifolds 20, 21. The manifold 20 (the valve-side manifold) is disposed at a vehicle front side of the high-pressure tanks 18, and is an elongated tubular body that extends in the vehicle transverse direction (the direction in which the high-pressure tanks 18 are arrayed). Connecting portions 20A that are connected to the connecting portions 30A of the mouthpieces 30 are provided at the manifold 20. The plural connecting portions 20A are provided so as to correspond to the respective positions of the high-pressure tanks 18, and, in the present embodiment, eleven of the connecting portions 20A are provided. A flow path is formed at an interior of the manifold 20. Interiors of the plural high-pressure tanks 18 communicate with one another by this flow path. Plural front side mounting pieces 36 are provided at the manifold 20. The plural (three in the present embodiment) front side mounting pieces 36 are lined up in the vehicle transverse direction, and are fixed to a bottom wall 44 of the case 22 by plural brackets 60.

A lead-out pipe 32 is provided at a vehicle transverse direction intermediate portion of the manifold 20 (the intermediate portion in the direction in which the high-pressure tanks 18 are arrayed). The lead-out pipe 32 is a tubular body that projects-out toward a vehicle front side from the manifold 20. The lead-out pipe 32 is provided at the same position in the vehicle transverse direction as the connecting portion 20A that is at a vehicle transverse direction center at the manifold 20.

On the other hand, the manifold 21 is disposed at a vehicle rear side of the high-pressure tanks 18. Rear end portions of the high-pressure tanks 18 are connected in the vehicle transverse direction by the manifold 21. The manifold 21 has plural (in the present embodiment, eleven) connecting portions 21A, in the same way as the manifold 20. These connecting portions 21A have insert-through holes through which the connecting portions 30A of the mouthpieces 30 are inserted. A flow path is formed at an interior of the manifold 21, and the interiors of the plural high-pressure tanks 18 communicate with one another by this flow path. Moreover, plural rear side mounting pieces 38 are provided at the manifold 21. The plural (three in the present embodiment) rear side mounting pieces 38 are lined up in the vehicle transverse direction, and are fixed to the bottom wall 44 of the case 22 by plural brackets 62.

The high-pressure tanks 18 and the manifolds 20, 21 are accommodated in the case 22. The case 22 is formed in the shape of a box that is substantially rectangular as seen in plan view. The case 22 is structured to include a case main body 40 and a cover member 42.

The case main body 40 is a box whose upper side is open, and is structured by the bottom wall 44 and a peripheral wall 46. The bottom wall 44 is made of an aluminum alloy or the like, and, as seen in plan view, is a substantially rectangular shape whose corners are rounded. Further, plural mounting holes 44A are formed with intervals therebetween in an outer peripheral portion of the bottom wall 44. Fastening members such as bolts or the like are passed-through the mounting holes 44A, and the bottom wall 44 of the case 22 is fastened to vehicle body frame members such as rockers or the like.

The peripheral wall 46 stands erect on the bottom wall 44. The peripheral wall 46 is formed by an extrusion molded product of an aluminum alloy, and is rectangular frame-shaped as seen in plan view.

The peripheral wall 46 is structured to include a front wall 48 that extends in the vehicle transverse direction at to vehicle front side, a rear wall 50 that extends in the vehicle transverse direction at a vehicle rear side, and a right wall 52 and a left wall 53 that connect the both end portions of the front wall 48 and the rear wall 50 in the vehicle longitudinal direction. Further, the front wall 48, the rear wall 50, the right wall 52 and the left wall 53 are respectively closed cross-sectional structures. Concretely, cross-sectional structures of the front wall 48, the rear wall 50, the right wall 52 and the left wall 53 are respectively closed-off structures that are shaped as rectangles whose lengths run along the vertical direction, and further have intermediate walls that divide these rectangles into upper and lower portions.

Further, a through-hole 48A that passes-through the front wall 48 in the vehicle longitudinal direction is formed in a vehicle transverse direction central portion of the front wall 48. The lead-out pipe 32 that is provided at the manifold 20 is led-out through the through-hole 48A to the exterior of the case 22. A valve 34 that can open and close the flow path of the manifold 20 is provided at the lead-out pipe 32. The amount of fluid flowing within the flow path can be controlled thereby. One end portion of an unillustrated pipe is connected to the valve 34, and the other end portion of this pipe is connected to the fuel cell stack or the like.

Vehicle transverse direction both sides of the rear end portion of the peripheral wall 46 are concave portions 51 that are recessed toward the vehicle front side as seen in plan view. (Only the concave portion 51 at the vehicle left side is illustrated in FIG. 2.) Therefore, a length of the interior of the case 22 along the vehicle longitudinal direction is shorter at the vehicle transverse direction both end portions than at a vehicle transverse direction central portion. Thus, the high-pressure tanks 18 that are accommodated at the vehicle transverse direction both sides are containers whose lengths in the vehicle longitudinal direction (the axial directions thereof) are shorter than those of the other high-pressure tanks 18.

The opening at the upper side of the case main body 40 is closed-off by the cover member 42. The cover member 42 is formed in the shape of a flat plate of an aluminum alloy or the like, and is a shape that corresponds to the peripheral wall 46. Therefore, cut-out portions 42A, which are cut-out toward the vehicle front side as seen in a plan view, are formed in vehicle transverse direction both end portions of a rear end portion of the cover member 42 in correspondence with the concave portions 51 of the peripheral wall 46. A step 42B is formed at an outer peripheral end portion of the cover member 42. The portion, which is further toward the outer side than this step 42B, is superposed on a top surface of the peripheral wall 46, and is fastened thereto by fastening members such as bolts or the like.

As shown in FIG. 2, a convex portion 71, which is convex upwardly with respect to general portions 72 of a top wall 70, is formed at the top wall 70. The top wall 70 is further toward the inner side than the step 42B at the cover member 42. The convex portion 71 is formed by press working for example. The general portions 72 extend in the vehicle horizontal direction.

Due to the convex portion 71 being formed, a back surface of the top wall 70 is, at the convex portion 71, a concave portion that is recessed upward. The convex portion 71 is formed in the shape of a cross as seen in a vehicle plan view. A central portion of this cross-shaped convex portion 71 is the most upwardly convex. Namely, at the central portion of the cross-shaped convex portion 71, the back surface of the top wall 70 is recessed the most upward, and the central portion of the cross-shaped convex portion 71 is the highest point in the vertical direction of the back surface of the top wall 70. Due thereto, the hydrogen, which has permeated from the high-pressure tanks 18 and whose specific gravity is low, is accumulates at the central portion of the cross-shaped convex portion 71. Namely, the central portion of the cross-shaped convex portion 71 functions as the "first hydrogen collection portion 73" where the hydrogen is accumulated.

The portions, which are other than the first hydrogen collection portion 73, of the cross-shaped convex portion 71 are guide portions 74 that are inclined downwardly in directions of moving away from the first hydrogen collection portion 73. Namely, the guide portions 74 which are inclined downwardly toward outer edge portions of the top wall 70 are formed in all of the front side, the rear side, the right side and the left side of the first hydrogen collection portion 73. The guide portions 74, due to their sloping, guide the hydrogen whose specific gravity is low to the first hydrogen collection portion 73.

Figure 4:
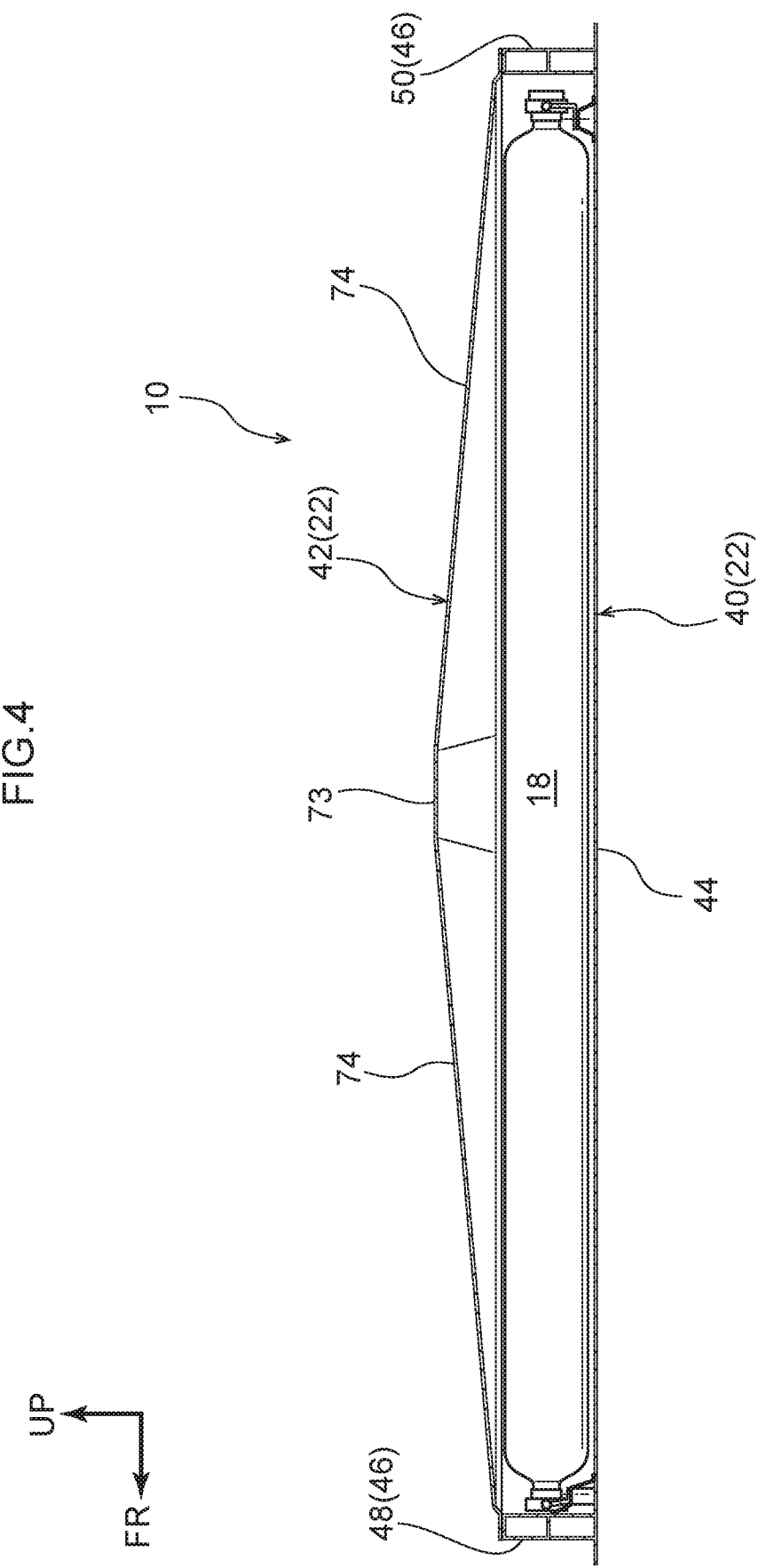
FIG. 4 is a cross-sectional view showing a state in which the high-pressure tank unit of the embodiment is cut at a vehicle transverse direction central portion along a plane that is orthogonal to the vehicle transverse direction.
Figure 5:
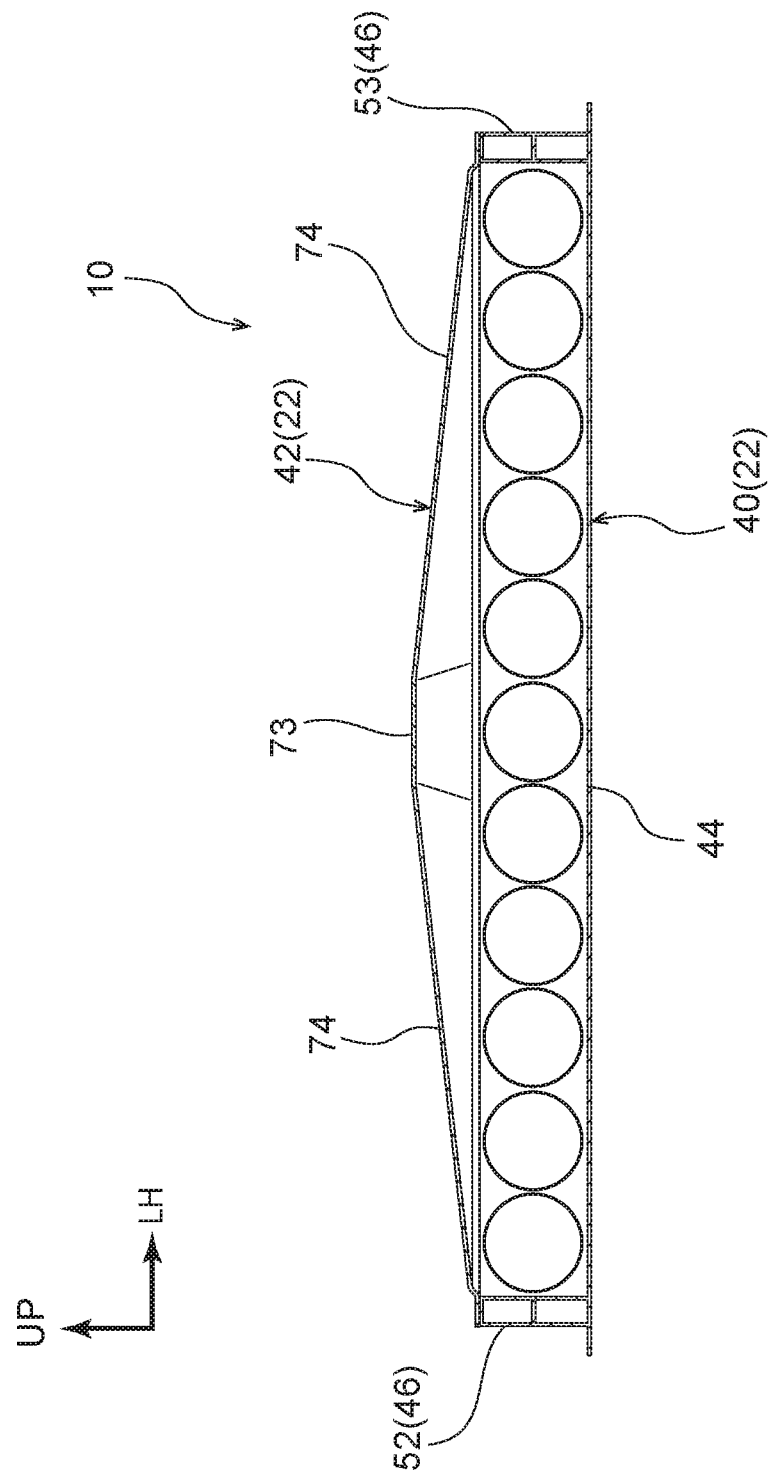
FIG. 5 is a cross-sectional view showing a state in which the high-pressure tank unit of the embodiment is cut along a plane that is orthogonal to the vehicle longitudinal direction.

Concretely, each of the guide portions 74 has a pair of side wall portions 74S that are connected to the adjacent general portions 72, and a ceiling wall portion 74T that connects the upper ends of the pair of side wall portions 74S together. The pair of side wall portions 74S extend in directions that are inclined slightly with respect to the vertical direction (refer to FIG. 4 and FIG. 5). Namely, when the guide portions 74 are cut along a plane orthogonal to the direction in which the guide portions 74 extend, cross-sectional shapes of the pairs of side wall portions 74S substantially are truncated chevron shapes, and a distance between upper ends of the pair of side wall portions 74S is shorter than a distance between lower ends of the pair of side wall portions 74S.

A hydrogen sensing sensor 80, which senses the hydrogen that has been accumulated at the first hydrogen collection portion 73, is disposed at the first hydrogen collection portion 73.

Figure 3:
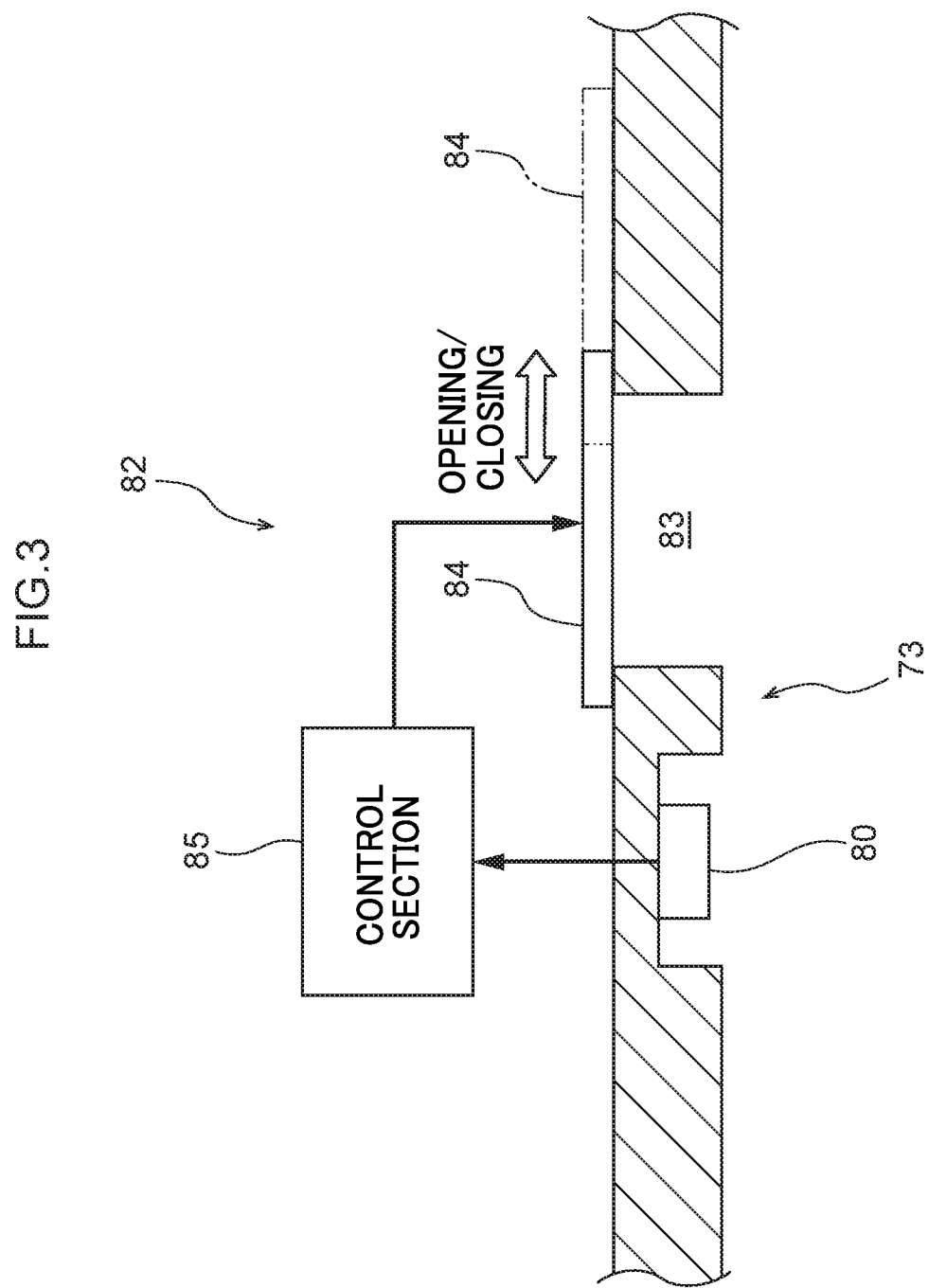
FIG. 3 is a schematic drawing showing a hydrogen sensing sensor and a discharging mechanism that are provided at a first hydrogen collection portion.

Further, a discharging mechanism 82 (see FIG. 3) is provided. The discharging mechanism 82 is a mechanism for discharging the hydrogen that has been accumulated in the first hydrogen collection portion 73, and is structured to include a discharge hole 83, a shutter 84, and a control section 85. The discharge hole 83 is formed in the first hydrogen collection portion 73, and the shutter 84 is structured so as to open and close the discharge hole 83. The control section 85 controls the opening and closing of the shutter in accordance with the output of the hydrogen sensing sensor 80.

Operation and Effects

The operation and effects of the present embodiment are described next.

In the present embodiment, the case 22 that has the bottom wall 44, the peripheral wall 46 and the top wall 70 is disposed beneath the floor of the vehicle cabin (at the vehicle lower side of the floor panel 16). The plural high-pressure tanks 18 are accommodated within the case 22 so as to be lined up. Due thereto, in a high-pressure tank mounting structure in which the plural high-pressure tanks 18 are disposed beneath the floor of a vehicle cabin, the high-pressure tanks 18 can be protected from interference with the road surface and from fire.

Moreover, in the present embodiment, the first hydrogen collection portion 73 that is recessed upwardly is formed at the back surface of the top wall 70 of the case 22. The hydrogen sensing sensor 80 is disposed at the first hydrogen collection portion 73. Due thereto, the hydrogen that has permeated from the high-pressure tanks 18 can be accumulated in the first hydrogen collection portion 73, and the accumulated hydrogen can be sensed by the hydrogen sensing sensor 80. Accordingly, the hydrogen that stagnates within the case can be sensed easily.

Further, in the present embodiment, the discharging mechanism 82, which discharges the hydrogen that has been accumulated at the first hydrogen collection portion 73, is provided. Due thereto, the hydrogen can be discharged effectively.

Further, in the present embodiment, the discharging mechanism 82 is structured to include the discharge hole 83, the shutter 84 and the control section 85. The interior and exterior of the case 22 communicate via the discharge hole 83. The discharge hole 83 is opened and closed by the shutter 84. The control section 85 effects control so as to open and close the shutter 84 in accordance with the output of the hydrogen sensing sensor 80. Due thereto, for example, the shutter 84 is closed at usual times, and in case in which hydrogen is sensed, by opening the shutter 84, the hydrogen is discharged appropriately while penetration of water and the like from the exterior can be suppressed.

Further, in the present embodiment, the first hydrogen collection portion 73 is positioned at the vehicle longitudinal direction central portion and the vehicle transverse direction central portion of the top wall 70. Due thereto, the hydrogen can be collected efficiently at the first hydrogen collection portion 73, as compared with a construction in which the first hydrogen collection portion 73 is positioned only in a vicinity of the edge portion of the top wall 70 as seen in a vehicle plan view.

Figure 6:
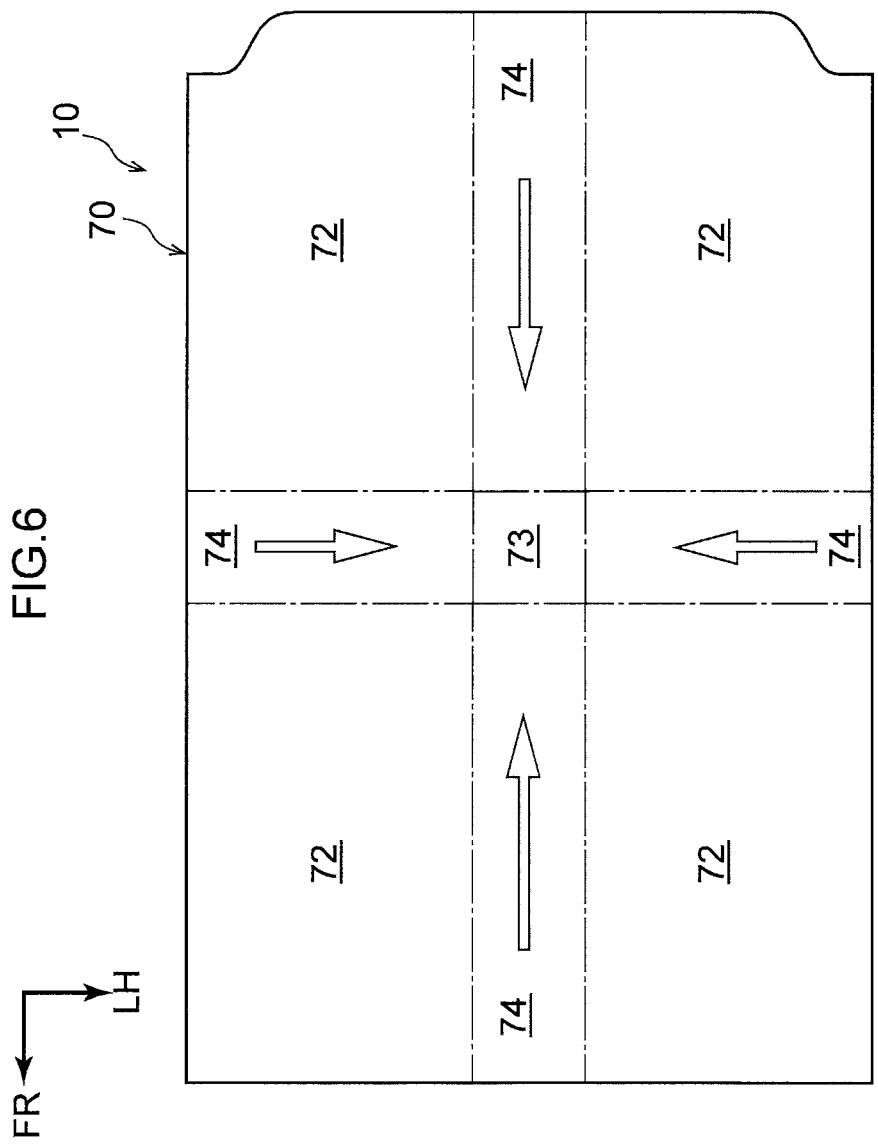
FIG. 6 is a drawing schematically showing movement of hydrogen which has permeated in the embodiment.

Further, in the present embodiment, the guide portions 74, which are inclined so as to slope downwardly toward the outer edge portions of the top wall 70, are formed at all of the front side, the rear side, the right side and the left side of the first hydrogen collection portion 73. Due thereto, as shown in FIG. 6, the hydrogen can be guided from the outer edge portions of the four directions by the guide portions 74 to the first hydrogen collection portion 73, and can be discharged-out therefrom.

Modified Example of Second Embodiment

Note that the above embodiment describes an example in which the guide portions 74, which are inclined so as to slope downwardly toward the outer edge portions of the top wall 70, are formed at all of the front side, the rear side, the right side and the left side of the first hydrogen collection portion 73. However, the guide portion 74 may be formed in at least one of the front side, the rear side, the right side and the left side of the first hydrogen collection portion 73. The portions where the guide portions 74 are not formed may be the general portions 72.

Figure 7:
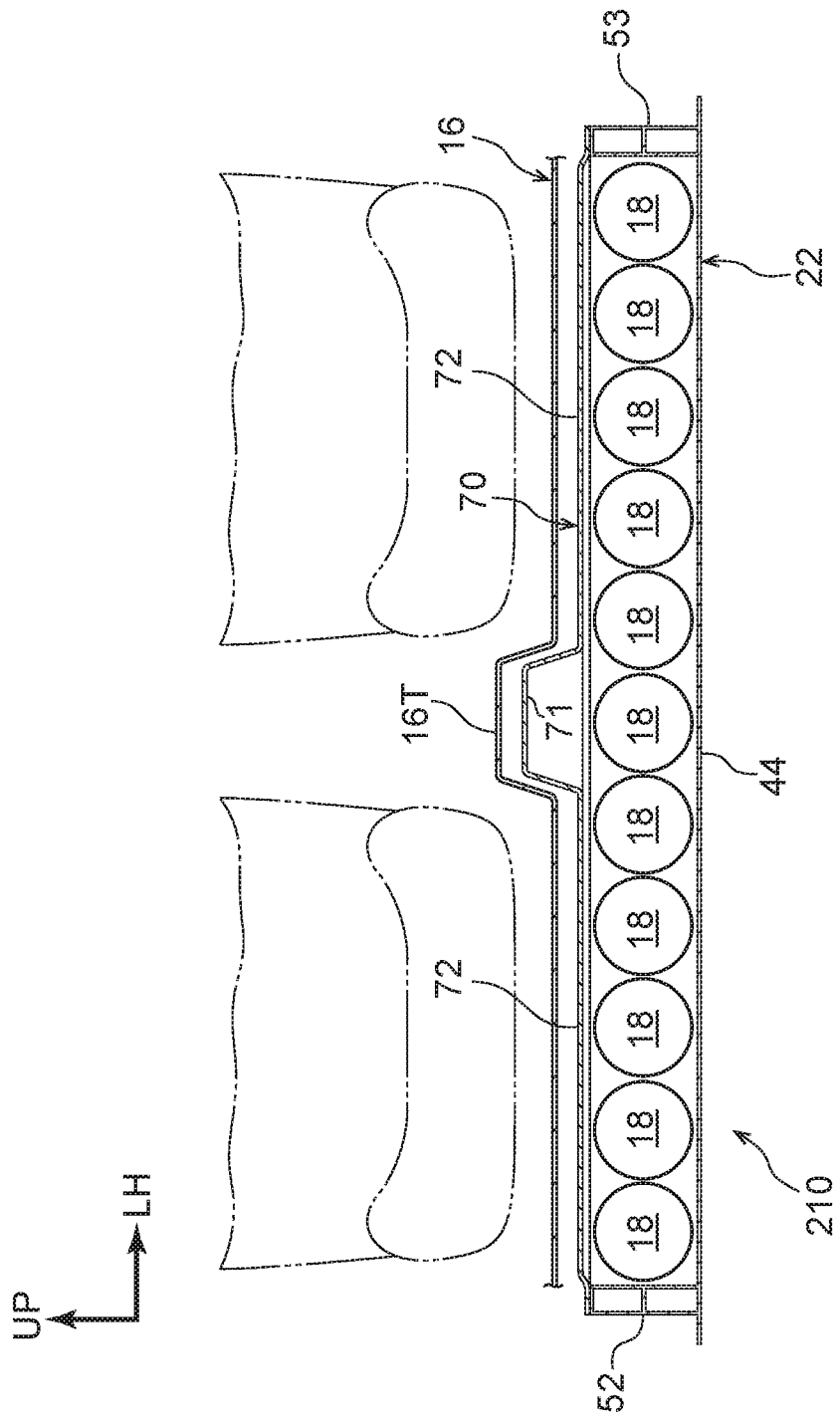
FIG. 7 is a cross-sectional view showing a state in which a high-pressure tank mounting structure of modified example 1 is cut along a plane that is orthogonal to the vehicle longitudinal direction.
Figure 8:
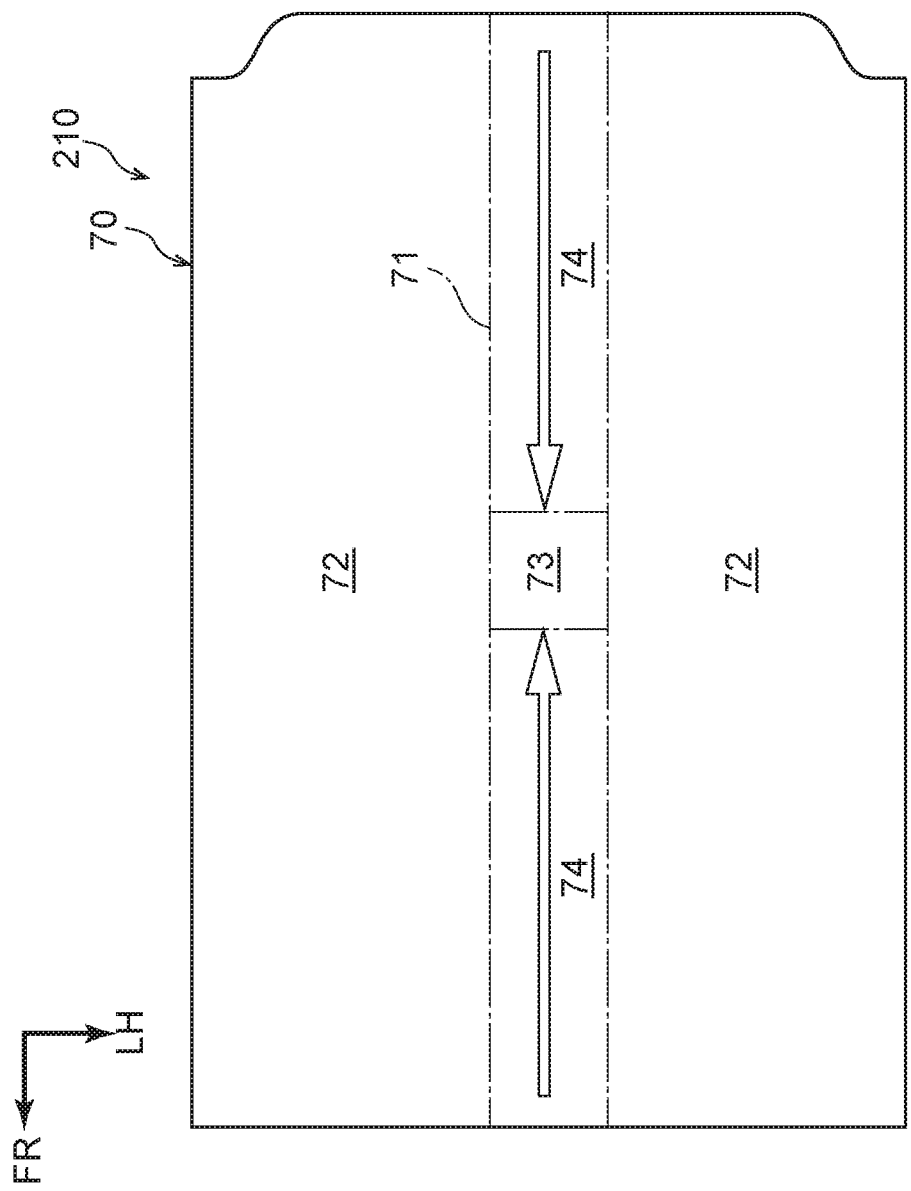
FIG. 8 is a drawing schematically showing movement of hydrogen which has permeated in modified example 1.

Further, there may be a high-pressure tank unit 210 that relates to modified example 1 and is shown in FIG. 7 and FIG. 8. In modified example 1, in the same way as in the above-described embodiment, the first hydrogen collection portion 73 at which the hydrogen sensing sensor 80 is disposed is positioned at the vehicle longitudinal direction central portion and the vehicle transverse direction central portion of the top wall 70. On the other hand, the guide portions 74 are formed only at the front side and the rear side of the first hydrogen collection portion 73. Therefore, of the top wall 70, the both side portions thereof that are at either side of the vehicle transverse direction central portion are the general portions 72. Further, as shown in FIG. 7, the convex portion 71 (the first hydrogen collection portion 73 and the guide portions 74) overlaps with a tunnel portion 16T of the floor panel 16, which structures the floor portion of the vehicle cabin, as seen in a vehicle plan view. Due thereto, the case 22 that has the convex portion 71 can be mounted by utilizing the tunnel portion 16T that is convex upwardly at the floor panel 16, and therefore, it is possible to place the high-pressure tank unit 210 at a relatively upper side of the vehicle. Note that, in modified example 1, the position of the first hydrogen collection portion 73 in the vehicle longitudinal direction may be changed. For example, the first hydrogen collection portion 73 may be positioned at the vehicle longitudinal direction front end portion and the vehicle transverse direction central portion, or may be positioned at the vehicle longitudinal direction rear end portion and the vehicle transverse direction central portion.

Note that modified example 1 may be changed to a structure in which only two of the guide portions are formed at the left side and the right side. Due thereto, owing to the convex portion 71 that extends over the entire vehicle transverse direction, the hydrogen can be trapped by the guide portions 74 when the vehicle 11 tilts forward or tilts rearward, and can be sensed by the hydrogen sensing sensor 80 of the first hydrogen collection portion 73.

Figure 9:
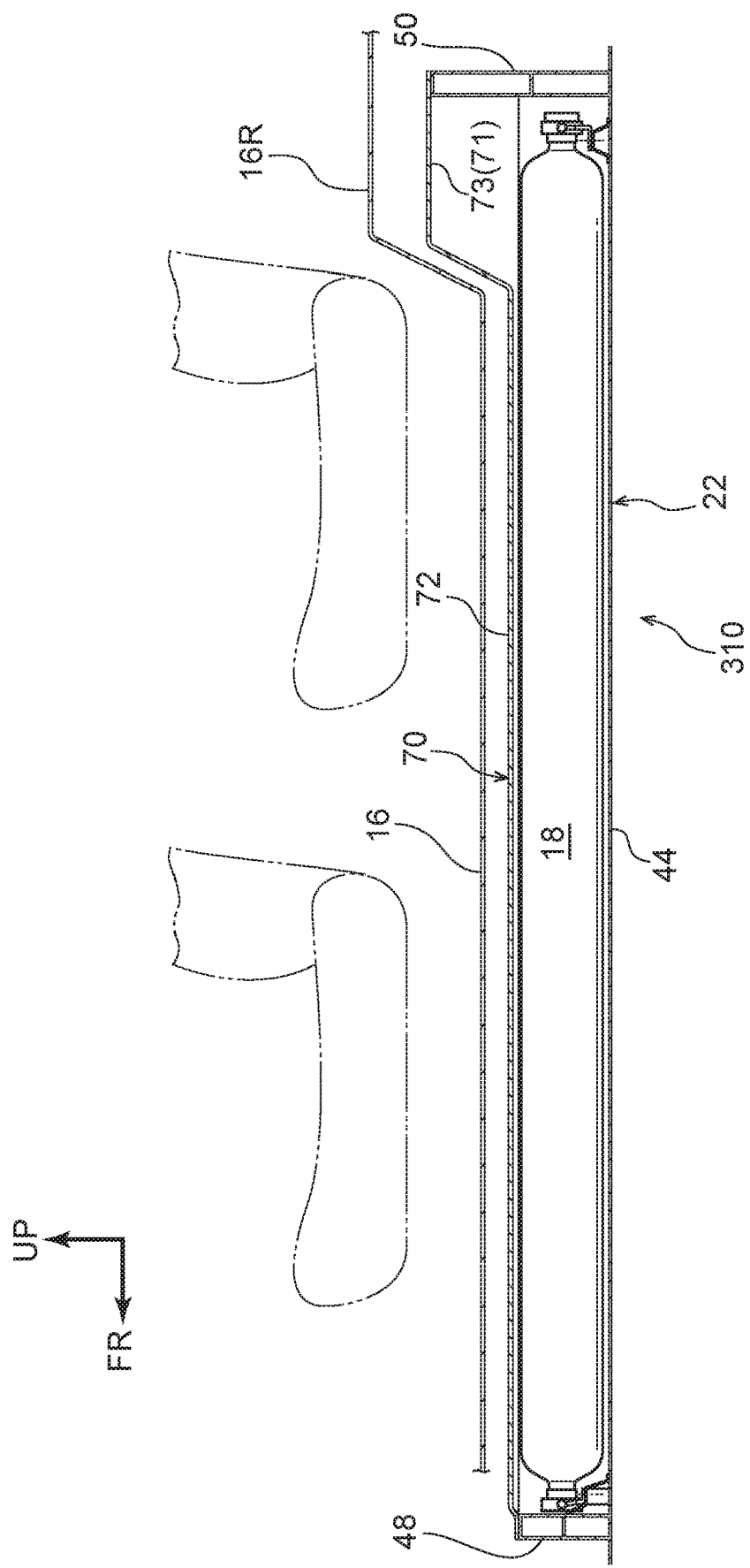
FIG. 9 is a cross-sectional view showing a state in which a high-pressure tank mounting structure of modified example 2 is cut along a plane that is orthogonal to the vehicle transverse direction.
Figure 10:
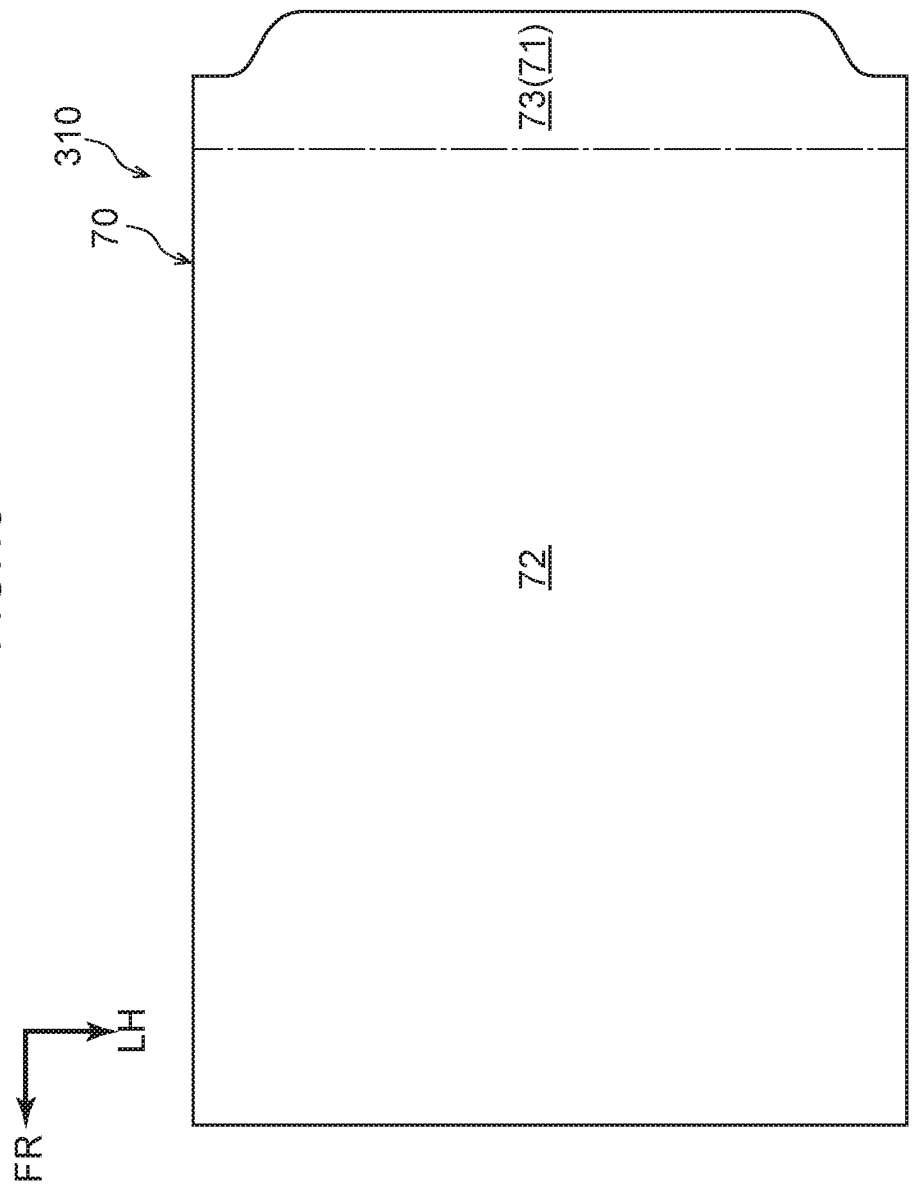
FIG. 10 is a drawing schematically showing movement of hydrogen which has permeated in modified example 2.

Further, there may be a high-pressure tank unit 310 relating to modified example 2 and shown in FIG. 9 and FIG. 10. In modified example 2, the first hydrogen collection portion 73 at which the hydrogen sensing sensor 80 is disposed is positioned at the vehicle longitudinal direction rear end portion of the top wall 70. The first hydrogen collection portion 73 is formed over the entire vehicle transverse direction at the vehicle longitudinal direction rear end portion of the top wall 70. The plural discharge holes 83 may be formed so as to be lined up in the vehicle transverse direction at the first hydrogen collection portion 73. As shown in FIG. 9, the convex portion 71, which is convex upwardly and is the portion of the top wall 70 where the first hydrogen collection portion 73 is formed, is disposed so as to, as seen in a vehicle plan view, overlap a rear portion 16R that is formed in a vicinity of a rear side of a rear seat at the floor panel 16. The rear portion 16R is convex toward the vehicle upper side with respect to the general portions of the floor panel 16, and is inclined obliquely toward the rear and upper side from the rear ends of the general portions, and, thereafter, extends toward the vehicle rear side in the horizontal direction. Due thereto, the case 22 that has the first hydrogen collection portion 73 (the convex portion 71) can be mounted by utilizing the rear portion 16R that is convex upwardly at the floor panel 16, and therefore, it is possible to place the high-pressure tank unit 310 at a relatively upper side of the vehicle.

Further, there may be a high-pressure tank unit 410 that relates to modified example 3 and is shown in FIG. 11. Modified example 3 is a structure in which, in modified example 2, the guide portion 74, which is inclined downwardly toward an outer edge portion (the front end portion) of the top wall 70, is formed at the front side of the first hydrogen collection portion 73. The guide portion 74 is formed at the vehicle transverse direction central portion. Due thereto, the hydrogen, which has been trapped by the guide portion 74 that extends in the vehicle longitudinal direction, can be guided to the first hydrogen collection portion 73. Moreover, the first hydrogen collection portion 73 is disposed so as to correspond to the rear portion 16R of the floor panel 16, and the guide portion 74 is disposed so as to correspond to the tunnel portion 16T of the floor panel 16. It is thereby possible to place the high-pressure tank unit 410 at a relatively upper side of the vehicle.

Further, there may be the high-pressure tank unit 510 that relates to modified example 4 and is shown in FIG. 12. Modified example 4 is a structure in which, in the above-described second embodiment (refer to FIG. 6 through FIG. 9), a second hydrogen collection portion 75, which is recessed upwardly and is positioned further toward a vehicle lower side than the first hydrogen collection portion 73, is formed at a back surface of the outer peripheral portion of the top wall 70. Due thereto, the hydrogen is trapped once by the second hydrogen collection portion 75, and is guided from the second hydrogen collection portion 75 via the guide portions 74 to the first hydrogen collection portion 73, and is discharged-out therefrom. Because the outer peripheral portion of the top wall 70 is a portion where the hydrogen is apt to be accumulated due to tilting of the vehicle 11, discharging of the hydrogen can be carried out effectively.

Note that, instead of the four guide portions 74 at the front, rear, left and right, modified example 4 may be changed to a structure in which only two of the guide portions at the front and the rear are formed, or may be changed to a structure in which only two of the guide portions at the left and right are formed.

Supplemental Description of Above Embodiments

Note that the above embodiments describe examples in which the discharging mechanism 82, which is for discharging the hydrogen that has been accumulated in the first hydrogen collection portion 73, is provided. However, the present invention is not limited to this.

Further, the above embodiments describe examples in which the discharging mechanism 82 is structured to include the discharge hole 83, the shutter 84 and the control section 85. However, the discharging mechanism of the present invention is not limited to this. It suffices for the discharging mechanism to have at least the discharge hole that communicates the interior and the exterior of the case.

Further, the above embodiments describe that the case main body 40 is a box whose upper side is open, and the opening at the upper side of the case main body 40 is closed-off by the cover member 42 that is shaped as a flat plate. However, the case of the present invention is not limited to this. For example, the case may be structured due to a box, whose lower side is open, being joined onto a bottom wall that is shaped as a flat plate.

What is claimed is:

1. A high-pressure tank mounting structure comprising:
   a case disposed beneath a floor of a vehicle cabin and having a bottom wall, a peripheral wall and a top wall; and
   a plurality of high-pressure tanks accommodated so as to be lined up within the case,
   wherein a first hydrogen collection portion that is recessed upwardly is formed at a back surface of the top wall of the case, and
   wherein a hydrogen sensing sensor is disposed at the first hydrogen collection portion.

2. The high-pressure tank mounting structure of claim 1, further comprising a discharging mechanism discharging, to an exterior of the case, hydrogen that has been accumulated at the first hydrogen collection portion.

3. The high-pressure tank mounting structure of claim 2, wherein the discharging mechanism comprises:
   a discharge hole (83) that communicates an interior of the case with the exterior of the case;
   a shutter that opens and closes the discharge hole; and
   a control section that controls opening and closing of the shutter in accordance with output of the hydrogen sensing sensor.

4. The high-pressure tank mounting structure of claim 1, wherein the first hydrogen collection portion is positioned at a vehicle longitudinal direction central portion and a vehicle transverse direction central portion of the top wall.

5. The high-pressure tank mounting structure of claim 1, wherein a guide portion, which is inclined downwardly toward an outer edge portion of the top wall, is formed at at least one of a front side, a rear side, a right side and a left side of the first hydrogen collection portion.

6. The high-pressure tank mounting structure of claim 5, wherein a second hydrogen collection portion, which is recessed upwardly and is positioned further toward a vehicle lower side than the first hydrogen collection portion, is formed at a back surface of an outer peripheral portion of the top wall.

7. The high-pressure tank mounting structure of claim 1, wherein guide portions, which are inclined downwardly toward outer edge portions of the top wall, are formed at all of a front side, a rear side, a right side and a left side of the first hydrogen collection portion.

8. The high-pressure tank mounting structure of claim 7, wherein a second hydrogen collection portion, which is recessed upwardly and is positioned further toward a vehicle lower side than the first hydrogen collection portion, is formed at a back surface of an outer peripheral portion of the top wall.

9. The high-pressure tank mounting structure of claim 1, wherein:
   the first hydrogen collection portion is positioned at a vehicle transverse direction central portion of the top wall,
   a guide portion, which is inclined downwardly toward an outer edge portion of the top wall, is formed at a front side or a rear side of the first hydrogen collection portion, and
   as seen in a vehicle plan view, the first hydrogen collection portion and the guide portion are configured to overlap a tunnel portion of a floor panel that structures a floor portion of the vehicle cabin.

10. The high-pressure tank mounting structure of claim 9, wherein a second hydrogen collection portion, which is recessed upwardly and is positioned further toward a vehicle lower side than the first hydrogen collection portion, is formed at a back surface of an outer peripheral portion of the top wall.

* * * * *